UNITED STATES PATENT OFFICE.

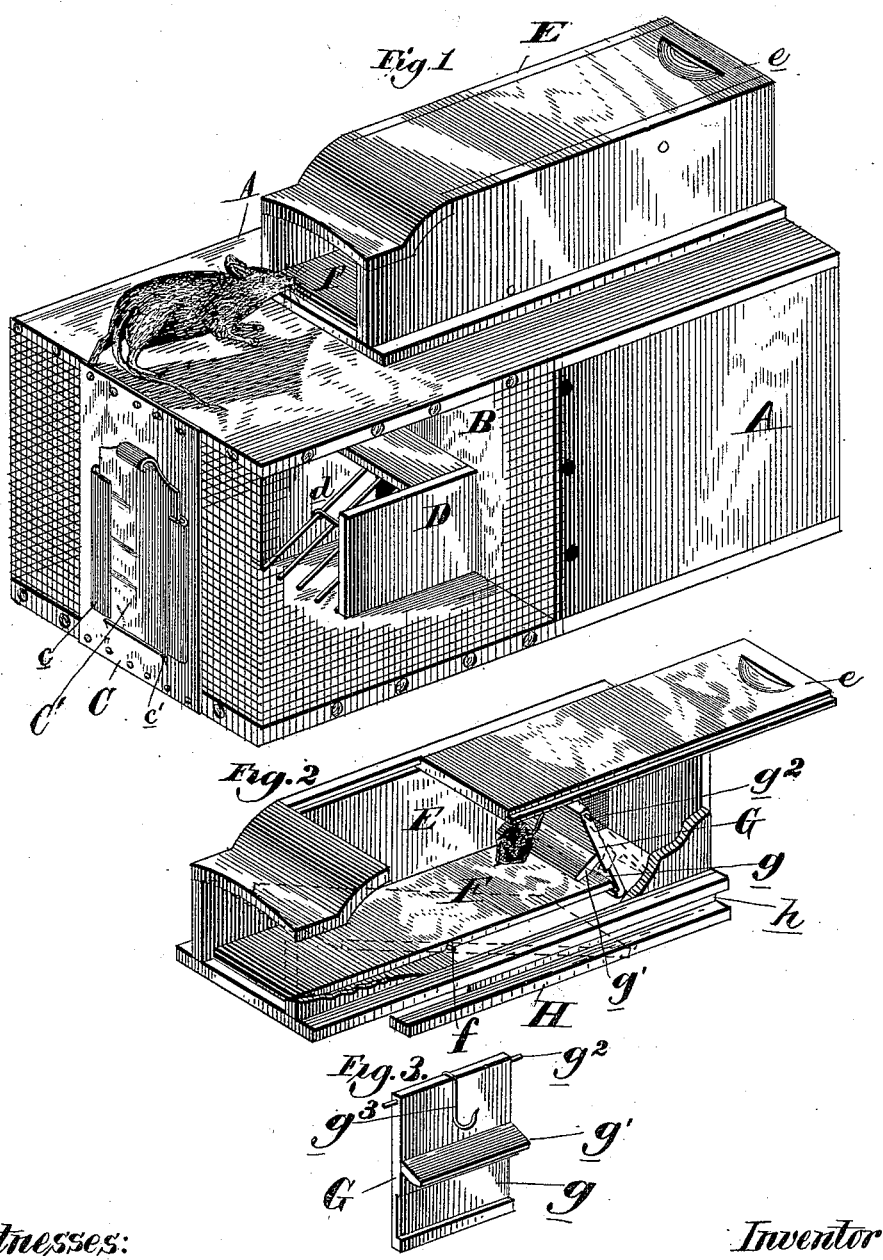

ALBERT WINSTON CARDOZO, OF WASHINGTON, DISTRICT OF COLUMBIA, ASSIGNOR OF ONE-FOURTH TO ARMAT STODDART, OF SAME PLACE.

ANIMAL-TRAP.

SPECIFICATION forming part of Letters Patent No. 421,066, dated February 11, 1890.

Application filed October 29, 1889. Serial No. 328,564. (No model.)

*To all whom it may concern:*

Be it known that I, ALBERT WINSTON CARDOZO, a citizen of the United States, residing at Washington, in the District of Columbia, have invented new and useful Improvements in Animal-Traps, of which the following is a specification.

My invention relates to an improvement in animal-traps; and it consists in the construction and arrangement of parts, hereinafter described, and definitely pointed out in the claim.

The object of my invention is to provide a cheap, simple, and durable trap the construction of which will permit of a ready inspection and easy access to the several chambers or parts for cleaning and adjusting purposes. I attain this object by the construction illustrated in the accompanying drawings, wherein like letters of reference indicate like parts in the several figures, and in which—

Figure 1 is a perspective view of the trap, the wire net being broken away to more clearly show the ingress to the forward chamber. Fig. 2 is a perspective view in detail of the top section, one side being removed to show the trap mechanism. Fig. 3 is a perspective view of the trigger.

Referring to the drawings by letters of reference, A represents a rectangular box having a rear closed portion and a forward portion with wire-netted sides and a central lateral partition B. The end of this box has a metallic plate C, formed with an opening with struck-up flanges $c$ on its sides, and a bent-out bottom $c'$, adapted to receive a sliding gate or shutter C', which works vertically in the flanges and rests when in the closed position on the portion $c'$.
In the partition B is formed an opening having a portal D, inclosing a swinging wire frame $d$, pivoted at the top with its forward ends extending out to the lower end of the portal.
In the top of the box A an opening is formed over the closed portion or rear chamber.

E represents a detachable trap placed on the top of the box A over the opening in its top. This trap is formed with two parallel sides and a sliding top $e$. The bottom of the trap is formed of a single weighted piece F, pivoted in the sides at $f$, near its weighted end.

The trigger G, as shown in Fig. 3, is constructed of a rectangular strip closely fitting in the interior of the box E, having a transverse groove $g$ on its lower forward face, and a pressure board or plate $g'$, extending obliquely downward from a point directly above the groove. This trigger is pivoted on suitable lugs $g^2$, secured in its upper end to the sides of the box E a short distance below its top. It has also a bait-hook $g^3$, secured near its upper edge. The trigger is placed in a position in the box directly over the end of the tilting bottom F, so that by inclining it slightly the end of the bottom will rest in the groove $g$, thereby holding the trigger in its inclined position and bringing the pressure-board $g'$ in proximity to the bottom.

The lower forward edge of the trigger and the upper rear edge of the tilting bottom F are beveled, for purposes hereinafter described.

The rear end of the box A is cut away (not shown) for the reception of a guide piece or tongue H, secured on the bottom of the trap portion E. This tongue H is connected with the portion E by a strip $h$, placed near its inner edge and extending part way its length, leaving the end of the tongue H free to adapt it to fit under the cover of the box A at the end of the opening. By this construction the box E may be slid off from the box A when it is desired to gain access to the rear chamber.

To set the trap and bait it, it is only necessary to slide the cover $e$ back, disclosing the interior.

The operation is as follows: The hook is baited and the rear end of the tilting floor F is placed in the groove in the trigger. As the animal approaches the bait, it being somewhat elevated, it will place its feet on the pressure-board $g'$ and immediately force the trigger back, releasing the end of the tilting bottom, and thereby be impelled into the box A. As soon as the bottom F is relieved of the weight of the animal its weighted end carries it back into its normal horizontal position, and as the lower end rises the beveled edge comes into contact with the beveled edge of the trigger, forcing the latter slightly back, and then drops into the groove $g'$, and is thereby again set for action. The forward chamber of the box A having the netted sides makes the interior light. The animal is thereby attracted into the chamber, the frame $d$ preventing his return to the other chamber. The rear chamber is thereby vacated and the tilting floor meets with no obstruction.

Having thus described my invention, what I claim, and desire to secure by Letters Patent, is—

In a trap, the combination of the box A, formed with an opening in its top and having a central partition B and the sliding gate C' in its end, the portal D in its center, a swinging frame $d$ in the portals, the removable trap portion E on the top of the box, consisting of vertical sides, a sliding top and a weighted tilting bottom F, the trigger G', pivoted between the sides of the top portion and having a transverse groove $g$ on its lower front face, an inclined pressure-board $g'$ on the trigger above the groove, and a hook above the board, and tongues H on the lower edge of the trap portion, adapted to fit beneath the top of the box, substantially as described.

In testimony whereof I affix my signature in presence of two witnesses.

ALBERT WINSTON CARDOZO.

Witnesses:
CHARLES F. MALLARD,
WM. W. PALMER.